United States Patent
Burkland et al.

(10) Patent No.: US 8,800,870 B1
(45) Date of Patent: Aug. 12, 2014

(54) SHORT-WAVE INFRARED BASED SCOPE

(71) Applicant: Raytheon Company, Waltham, MA (US)

(72) Inventors: Michael K. Burkland, Tucson, AZ (US); Christopher E. Thomas, Plano, TX (US); Robert Rinker, Tucson, AZ (US); Darrell R. Rogers, Tucson, AZ (US); Byron B. Taylor, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/768,081

(22) Filed: Feb. 15, 2013

(51) Int. Cl.
| G06F 19/00 | (2011.01) |
| G06G 7/80 | (2006.01) |
| F41G 3/08 | (2006.01) |
| G01C 3/08 | (2006.01) |
| H04N 5/33 | (2006.01) |
| F41G 3/06 | (2006.01) |

(52) U.S. Cl.
CPC .. F41G 3/08 (2013.01); G01C 3/08 (2013.01); H04N 5/33 (2013.01); F41G 3/06 (2013.01)
USPC .......................................... 235/404; 235/400

(58) Field of Classification Search
CPC ............... F41G 1/00; F41G 3/08; F41G 1/38; F41G 3/06; F41G 1/473; F41G 3/145; F41G 7/26; G01C 3/00; G01C 3/08
USPC ............................. 235/400, 404; 42/111, 114
See application file for complete search history.

(56) References Cited

U.S. PATENT DOCUMENTS

| 4,919,536 | A | 4/1990 | Komine |
| 5,469,250 | A | 11/1995 | Holmes |
| 6,247,259 | B1 | 6/2001 | Tsadka et al. |
| 7,289,683 | B2 * | 10/2007 | Trudeau ..................... 382/274 |
| 8,196,828 | B2 * | 6/2012 | Kelly ........................... 235/404 |
| 2005/0094888 | A1 * | 5/2005 | Trudeau ..................... 382/260 |
| 2007/0158493 | A1 | 7/2007 | Shapira et al. |
| 2009/0320348 | A1 * | 12/2009 | Kelly .............................. 42/119 |
| 2010/0128136 | A1 * | 5/2010 | Belenkii ................... 348/222.1 |
| 2013/0021474 | A1 | 1/2013 | Taylor et al. |

OTHER PUBLICATIONS

Army, "12.2 Small Business Innovation Research (SBIR) Proposal Submission Instructions", Apr. 24, 2012, pp. 1-7, 58, and 59.
Belen'Kii, M.S. et al., "Single-Ended Laser Wind Sensor", SPIE, vol. 2828, No. 489, Feb. 18, 2010.
Harris, M. et al., "Lidar for Turbine Control", National Renewable Energy Laboratory, Technical Report, Jan. 2006.
McLees, Lea, "Accurate, Inexpensive Optical Sensor Measures Average Wind Direction Over Long Distances", Georgia Tech Research News, Jan. 7, 1997.
Ottesen, Joe E. et al., "Helicopter Remote Wind Sensor (HRWS) Ground Test", US Army Electronics Research and Development Command Atmospheric Sciences Laboratory, Oct. 1979.

(Continued)

Primary Examiner — Tuyen K Vo
(74) Attorney, Agent, or Firm — Lando & Anastasi, LLP

(57) ABSTRACT

An infared-based scope configured to obtain and display video imagery that allows a user to estimate wind speed and direction over a trajectory to a target based on observed air motion in the video imagery. In certain examples, the scope further includes electronics configured to calculate the wind speed using video image processing techniques.

20 Claims, 3 Drawing Sheets

(56) References Cited

OTHER PUBLICATIONS

Porat, Omer et al., "Crosswind Sensing from Optical-Turbulence-Induced Fluctuations Measured by a Video Camera", Applied Optics, vol. 49, No. 28, Oct. 1, 2010.

Ryznar, Edward, "Dependency of Optical Scintillation Frequency on Wind Speed", Applied Optics, vol. 4, No. 11, Nov. 1965.

Shapira, J. et al., "Atmospheric Cross-Wind and Turbulence Measurements Using Turbulence-Induced Scintillations", SPIE, vol. 7684, 2010.

University of Illinois Urbana-Champaign, "Scintillation Based Crosswind Velocity Measurement", Gasdynamics and Laser Diagnostics Research Laboratory.

Von Wahlde, Raymond et al., "Application of an Inertial Reticle System to an Objective Personal Weapon", Army Research Laboratory, Feb. 1996.

Wang, Ting-i et al., "Wind Measurements by the Temporal Cross-Correlation of the Optical Scintillations", Applied Optics, vol. 20, No. 23, Dec. 1, 1981.

Zak, J. Allen, "Atmospheric Boundary Layer Sensors for Application in a Wake Vortex Advisory System", NASA/CR-2003-212175, Apr. 2003.

* cited by examiner

SHORT-WAVE INFRARED BASED SCOPE

BACKGROUND

In long-range shooting significant deflection of the round may be caused by air motion (e.g., wind) requiring adjustments to correct for the air motion to achieve the desired accuracy. Air motion causes round (or bullet) deflection that increases quadratically with range. For example, a deflection of 4 inches over a range to target of 200 yards increases to a deflection of 16 inches at 400 yards. In many circumstances, for example in military and hunting applications, the range to target can exceed 1000 yards. Therefore, wind speed determination may be critical to accurate targeting. In addition, air motion from shooter to target may be highly variable and dependent upon topology and the presence of obstacles (such as a plants or buildings, etc.) between the shooter and the target. Therefore, measurements of wind speed and direction at the shooter's location, for example using an anemometer, may not accurately predict air motion over the path of the round from the shooter to the target. Wind deflection is also an issue in applications other than long range shooting, such as golf, for example.

SUMMARY OF INVENTION

Aspects and embodiments are directed to a shortwave infrared (SWIR) based scope that incorporates methods and apparatus for allowing a user to estimate wind speed and direction in the path between the user and a target.

According to one embodiment, an infrared scope comprises an illuminator configured to emit an infrared illumination beam along a trajectory toward a target, an imaging detector configured to receive reflected infrared electromagnetic radiation from the illumination beam and to generate images of a scene including the target from the electromagnetic radiation, the image further including scintillation cells in the trajectory, a processor coupled to the imaging detector and configured to generate video imagery from the images generated by the imaging detector, movement of the scintillation cells in the video imagery being representative of wind speed and wind direction across the trajectory, and a display coupled to the processor and configured to display the video imagery.

In one example the infrared illumination beam is in the short-wave infrared spectral band. For example, a wavelength of the infrared illumination beam may be approximately 0.808 micrometers or approximately 1.520 micrometers. In one example the imaging detector includes a two-dimensional focal plane array coupled to a read-out integrated circuit, the focal plane array including a plurality of rows of pixels. The read-out integrated circuit may be configured to individually and sequentially activate and subsequently deactivate each row of the plurality of rows of pixels to generate lines of image data, each line corresponding to a row of the plurality of rows of pixels, and wherein the imaging detector is configured to construct the images from the lines of image data. In one example a directional orientation of the illuminator is synchronized with the read-out integrated circuit, and the illuminator is configured to sequentially illuminate portions of a field of view of the imaging detector, each portion corresponding to an activated row of the plurality of rows of pixels. The processor may be further configured to calculate an estimate of the wind speed across the trajectory based on the movement of the scintillation cells. The display may be further configured to display the estimate of the wind speed. In another example, the scope includes a laser range-finder, for example, the illuminator may be configured as a laser range-finder, the laser range-finder configured to provide an estimate of a range to the target. The processor may be further configured to provide a targeting offset value based on the range and the estimate of the wind speed.

According to another embodiment a method of providing an estimate of wind speed and direction over a trajectory to a target comprises acts of illuminating a scene including the trajectory with infrared electromagnetic radiation, obtaining infrared-based video imagery of the scene, the video imagery including moving scintillation cells in the trajectory, and displaying the video imagery including the moving scintillation cells to allow for observation of the moving scintillation cells by a user.

In one example the method further comprises estimating the wind speed and direction based on the observation of the moving scintillation cells. In another example the method further comprises calculating the wind speed estimate based on the moving scintillation cells, and displaying the wind speed estimate. The method may further comprise estimating a range to the target, and providing a targeting offset based on the range and the wind speed estimate. In certain examples illuminating the scene includes illuminating the scene with the infrared electromagnetic radiation having a wavelength of approximately 0.808 micrometers or approximately 1.520 micrometers. Obtaining the infrared-based video imagery may include receiving reflected infrared electromagnetic radiation from the scene with a focal plane array. In one example obtaining the infrared-based video imagery includes sequentially activating rows of pixels of the focal plane array, sequentially deactivating and reading out the rows of pixels of the focal plane array to produce lines of image data, and generating the infrared-based video imagery from the lines of image data. Illuminating the scene may include synchronously sequentially illuminating portions of a field of view of the focal plane array, each portion corresponding to an activated row of pixels of the focal plane array.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to a scope, such as may be used by a hunter, sniper, other shooter, and the like, that allows the user to see a visual representation of air motion across the range to the target. As discussed in more detail below, embodiments of the scope include an illuminator that illuminates the scene viewed by the user of the scope and allows air motion across the range to target to be observed. Close the ground, there exist localized "cells" or pockets of air having optically distinct differences in indices of refraction to neighboring regions of air, all flowing in a laminar manner in the direction of prevailing wind. This variation in index of refraction scatters or refracts electromagnetic radiation differently, a phenomenon known as scintillation, allowing the user to track the laminar air flow along the path to the target. According to certain embodiments, particular wavelengths of infrared radiation are selected for the illumination, allowing the system to be both covert and eye-safe, as discussed further below. In addition, using known range information and by timing the observed air flow motion, estimations of wind speed may be obtained.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
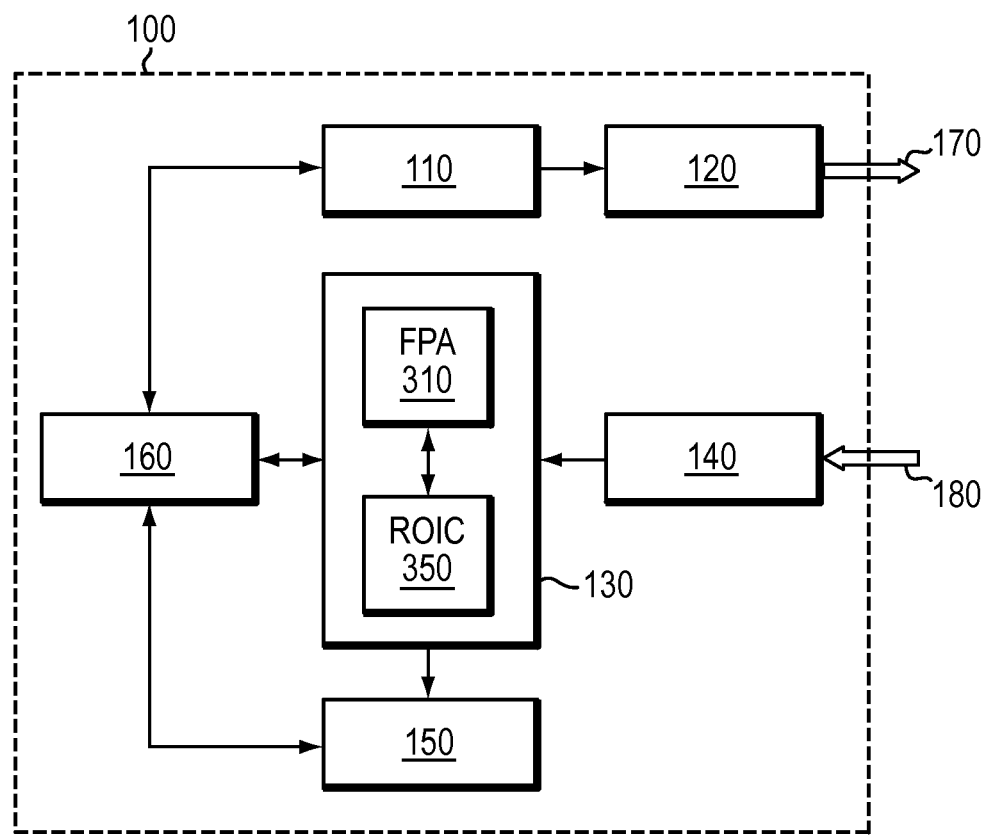
FIG. 1 is a block diagram of one example of a shortwave infrared (SWIR) based scope according to aspects of the invention.

Referring to FIG. 1, there is illustrated a block diagram of one example of a scope according to certain aspects. The scope 100 includes an illuminator 110 and associated transmit optics 120 that produces an illumination beam 170, and an imaging detector 130 and associating imaging optics 140 that receives electromagnetic radiation 180 and produces imagery of a viewed scene. The imaging detector 140 is coupled to a display 150 configured to display the imagery for viewing by a user of the scope 100. The scope further includes a controller 160 (also referred to as a processor) coupled to any or all of the illuminator 110, imaging detector 130, and/or display 150, and configured to implement various control functions as discussed further below. In some examples the controller 160 provides the necessary hardware, software and memory to control operation of the scope 100, and may be electrically connected to components within the scope to coordinate operation thereof. It is to be appreciated that the block diagram of FIG. 1 is a schematic representation only; practical implementations of embodiments of the scope 100 may include numerous other components such as one or power supplies, components related to other functions, connectors, etc., as will be recognized by those skilled in the art.

According to one embodiment, the illuminator 110 includes a collimated light source, such as a laser, a fiber-coupled laser, or one or more light-emitting diodes (LEDs), that produce the illumination beam 170. The transmit optics 120 may include one or more optical elements, such as mirrors, lenses, or other beam-forming optics. In one embodiment, the illuminator 110 also functions as a laser range-finder which will be familiar to those skilled in the art of hunting and shooting. However, in other embodiments, the scope 100 may be provided with a separate range-finder.

In one embodiment, the illuminator 110 is configured to emit an illumination beam 170 that is in the infrared region of the electromagnetic spectrum. More particularly, the illumination beam 170 may be in the shortwave infrared (SWIR) or near infrared (NIR) spectral bands including wavelengths in a range from approximately 0.75 µm to 3.0 µm. As discussed further below, the inventors have demonstrated that using an illumination beam 170 in this wavelength range allows the above-discussed scintillation and associated air movement to be observed. Advantageously, certain wavebands in this wavelength range are also generally considered "eye-safe" and therefore may be compatible with various night vision applications, for example. In addition, in certain examples, the illuminator 110 is configured to produce the illumination beam 170 at a wavelength that it outside of typical wavebands used in laser applications, such as laser designators or range-finders, for example, (e.g., 1.064 µm), such that the illumination beam 170 may remain covert. In one example the illumination beam has a wavelength of approximately 0.808 µm. In another example, the illumination beam has a wavelength of approximately 1.520 µm.

When the illumination beam 170 illuminates the path between the scope 100 (and therefore the shooter) and a target, it is refracted (scattered) by localized cells of air with varying optical indices of refraction resulting in an optical path length difference from neighboring regions of air, producing the effect of scintillation. Accordingly, electromagnetic radiation 180 received by the imaging optics 140 and returned to the imaging detector 130 includes information from the refraction (scattering) in the air over the trajectory of the illumination beam 170. The imaging optics 140 may include one or more optical elements, such as mirrors or lenses that are arranged to collect, concentrate and optionally filter the electromagnetic radiation 180, and focus the electromagnetic radiation onto a focal plane of the imaging detector 130. The imaging detector 130 may be selected to be sensitive to infrared radiation, including at least the wavelengths of the illumination beam 170, such that the imaging detector may form imagery of the illuminated scene.

In one embodiment, the imaging detector 130 is a video detector configured to form video imagery of the illuminated scene from the received electromagnetic radiation 180. The imaging detector 130 may include a two dimensional focal plane array 310 or other photo-sensitive device, coupled to a read-out integrated circuit (ROIC) 250. The ROIC 350 produces electrical signals in response to electromagnetic radiation detected by the focal plane array 310. In one example the controller 160 includes a video image processor configured to receive the electrical signals from the imaging detector 130, these electrical signals being representative of imagery of the illuminated scene, and to produce video imagery from the electrical signals. The controller may be further configured to format the video for viewing on the display 150 by the user. For example, in embodiments in which the electromagnetic radiation 180 is in the infrared spectral band, the controller 160 may be configured to produce the video imagery in a representation of the visible spectral band using various processing and colorizing techniques known to those skilled in the art.

In accordance with embodiments, the ROIC 350 of the imaging detector may be configured to activate at least a portion of the focal plane array 310 during an integration time of the imaging detector 130, and the illuminator 110 may be synchronized with the ROIC to illuminate at least a portion of the field of view (FOV) of the imaging detector that corresponds to the activated portion of the focal plane array. In some examples, the portion of the focal plane array 310 that is activated is less than the entire active region of the focal plane array, and the portion of the field of view that is illuminated is less than the entire sensor field of view, as discussed further below.

As discussed above, in one example, the display 150 is configured to display video imagery received from the controller and/or imaging detector 130. This video imagery may include a video of the illuminated scene, which includes the path from the scope 100 to a target. The inventors have discovered that if the wavelength of the illumination beam 170 is appropriately selected, such as one of wavelengths discussed above, the flow of air is visible in the video imagery as a result of the scintillation phenomenon caused by optically distinct variations in the refractive indices of neighboring cells/regions of air. This visible flow reveals air motion in the path to the target. Thus, as a user views the video on the display, the user may observe the air flow which may provide an intuitive sense of the wind speed and direction in the path. This may be very useful to the user to allow the user to make ballistic corrections to account for wind deflections along the path to the target.

The ability to observe the air flow through the scintillation phenomenon at infrared wavelengths was demonstrated as follows. A scope including an illuminator such as discussed above was aimed and focused at a selected target object, and video data was recorded. In one demonstration the wavelength of the illumination beam was 0.808 μm, and in another demonstration the wavelength of the illumination beam was 1.520 μm. The scope included a video imaging detector configured to obtain scanned video at 0.808 μm for the first demonstration and 1.520 μm for the second demonstration. Wind phenomenology was observed to be highly pronounced in the SWIR waveband. In particular, movement of localized regions of refractive index variation, referred to herein as "scintillation cells," was clearly observable in the video imagery. Using 0.808 μm illumination, windblown debris was observed moving across the video imagery at the same rate of movement of the scintillation cells, evidencing that the perceived movement of the scintillation cells may provide a reasonable representation of air flow, or wind, across the field of view.

In addition to providing a visual representation of wind flow, the observed scintillation may be used to obtain numerical estimates of the wind speed. Wind speed measurements based on scintillation is commercially available technology. Certain conventional wind speed measurement techniques based on scintillation typically require optically coupled or co-joined transmitters and receivers. However, there are two approaches that use a single detector, namely the zero crossing technique and the auto-covariance technique, both of which are described in the relevant literature. The auto-covariance approach is based on the observation that wind speed is related to the temporal correlation of a pixel in a pixelated detector array, as described for example in *Crosswind sensing from optical-turbulence-induced fluctuations measured by a videocamera*, J. Shapira & O. Porat, Applied Optics 49, 5236-5244 (2010).

Figure 2:
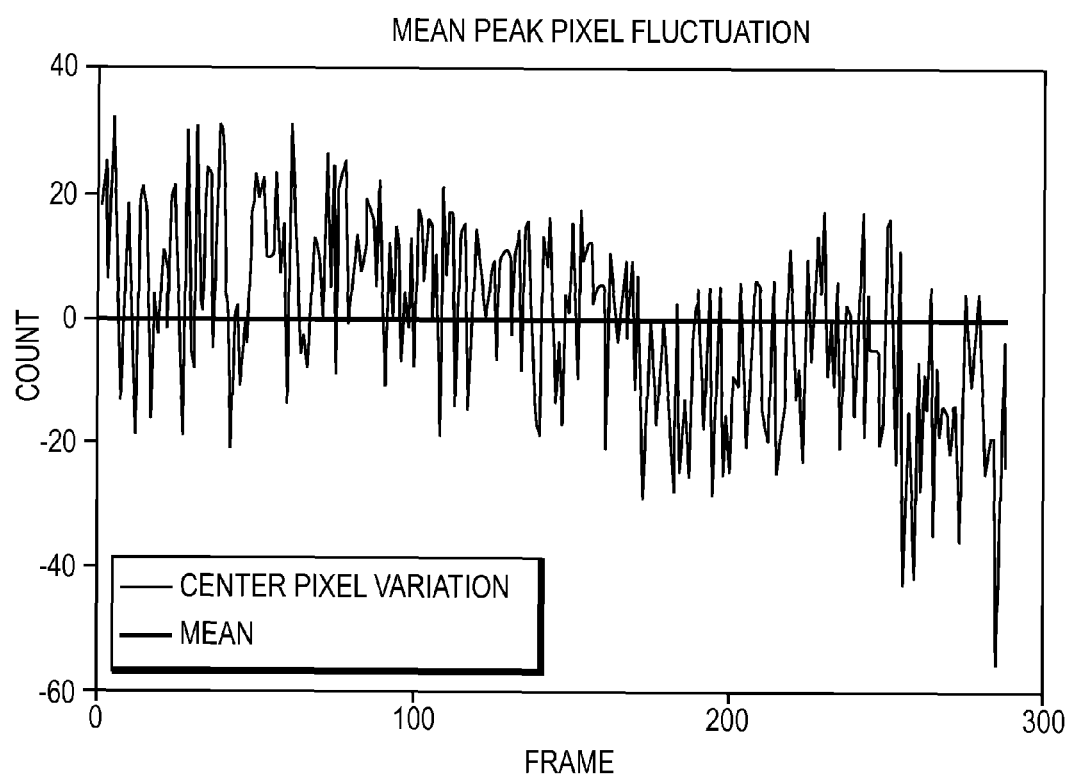
FIG. 2 is a graph of zero crossing data obtained in accord with aspects of the invention.

In one example, the zero crossing technique was applied to video data collected using the scope discussed above to obtain a cross wind speed measurement. In this example, the scope including the illuminator was aimed and focused at a selected target object and video data recorded, as discussed above. The range to the selected target was 1.1 kilometers (km). The recorded video data file included 288 frames at a frame rate of 30 Hz. The wind direction was known to be East-South-East. Selected bright point objects in the video file were used as point sources for the wind speed calculation. FIG. 2 illustrates the zero crossing data obtained in this example. The center pixel of the detector array was used for this computation. The average value from the pixel is subtracted from the data and the number of zero crossings counted. In this example, there are 133 zero crossings.

From this data, an estimate of the cross wind speed relative to the viewing angle may be computed according to the following formula:

$$v = \frac{f_m \cdot (\lambda \cdot L)^{0.5}}{c} \quad (1)$$

In Equation (1) v is the estimated cross wind velocity, $f_m$ is half the number of zero crossings and the frame rate (in this example, 133/2 at a frame rate of 30 Hz), λ is the wavelength of the illumination (in this example, 1.52 μm), L is the range to the source (in this example, 1.1 km), and C is a constant estimated in the literature, and which may be device dependent. In this example, a value of C=0.28 was used, consistent with the parameter measured in *Dependency of Optical Scintillation Frequency on Wind Speed*, Ryznar, Applied Optics, 4, 1416-1418 (1965). Based on these values, Equation (1) produces an estimated cross wind speed of 2.3 miles per hour. This value was consistent with wind speed data collected on the same date as the video file and taken from a located weather centre approximately 1.5 miles from the site at which the video data was recorded.

It will be appreciated by those skilled in the art, given the benefit of this disclosure, that there are numerous factors that affect the wind speed calculations, including, for example, the dynamic range and frame rate of the detector array. The accuracy of the wind speed measurements may be improved by optimizing some or all of these factors.

As discussed above, the scope may include a laser range-finder. For example, the illuminator 110 may be configured to function as a range-finder, and provide an estimate of the range to the target along the trajectory. The controller 160 may use the estimated range to the target obtained from the laser range-finder, in combination with the calculated wind speed estimate, to produce a targeting offset which may be provided to the user (e.g., displayed on the display). The targeting offset may include a vertical and/or horizontal adjustment needed to be made to the aiming direction of the weapon associated with the scope to compensate for the wind over the range to the target.

According to one embodiment, the video data displayed to the user and used to calculate the wind speed estimates may be collected using a staring detector array. CCD and CMOS staring detector arrays are commercially available. When staring detector arrays are used, the entire active region of the focal plane array is exposed for each frame, the shutter is then closed, or the active region of the detector array is disabled, and the image is read out from the array by the ROIC and processed.

Figure 3:
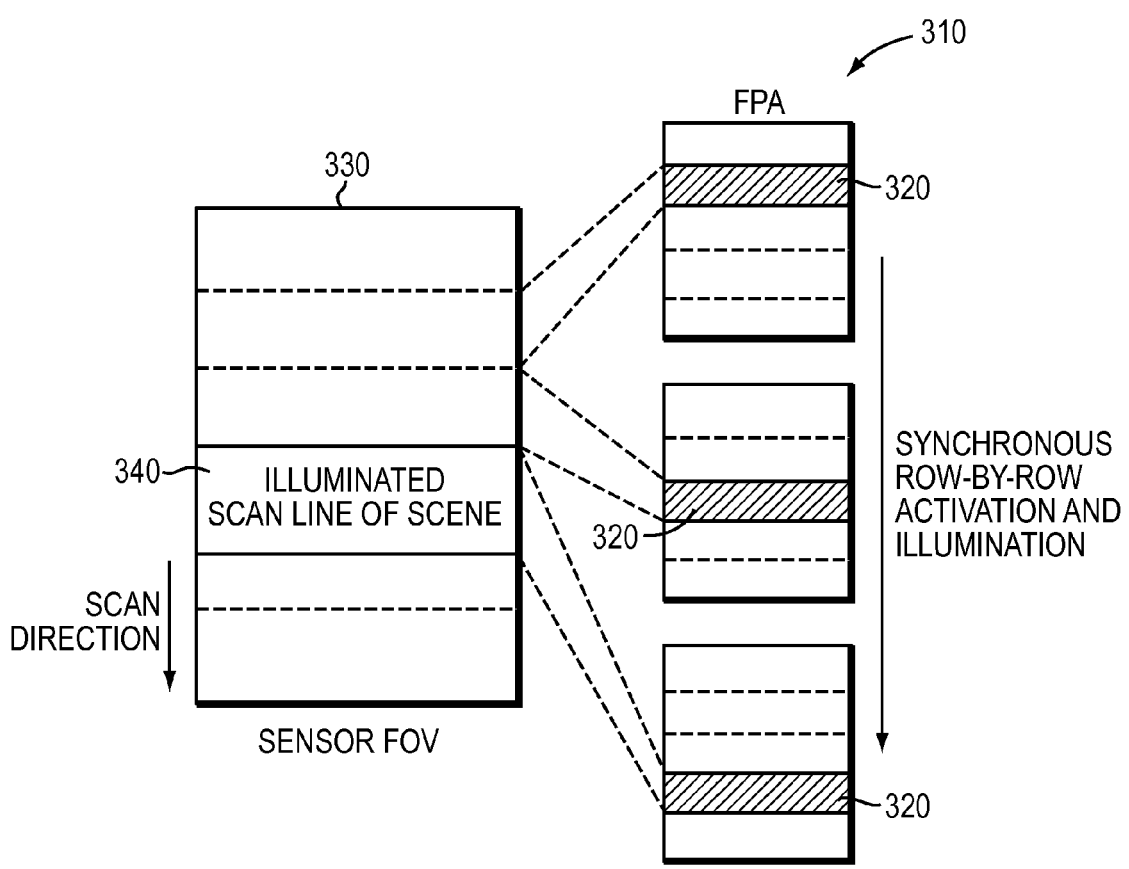
FIG. 3 is a graph illustrating one example of rolling shutter operation of an imaging detector according to aspects of the invention.

As discussed above, in other embodiments, the ROIC 350 of the imaging detector 130 may be configured to activate only a portion of the focal plane array 310 during each integration time. In particular, according to another embodiment, a "rolling shutter" configuration for the imaging detector 130 may be used. FIG. 3 illustrates a flow diagram corresponding to a schematic example of rolling shutter operation. The focal plane array 310 comprises a plurality of rows 320 of pixels. When a row 320 is activated, the pixels (also known as unit cells) of the row are configured to collect and integrate photons of light. After the integration, the ROIC 350 is configured to deactivate the row 320 and read out values of each of the pixels for subsequent image generation. In rolling shutter operation, the ROIC (optionally under control of the controller 160) is configured to activate one or more rows 320 of the focal plane array 310 during an integration time in a sequential, row-by-row manner. The active row(s) is then disabled and read out, while the next row(s) is activated. The image 330 is built line by line by progressive scans 340. The ROIC 350 may be configured to activate only a single row 320 per scan, or more than one row 320, but fewer than all rows, per scan.

As used herein, the terms "row" and "column" may be interchanged without affecting the scope of the embodiments. Although the term "row" may generally be used to refer to a set of one or more pixels of the focal plane array 110 in the x-direction or horizontal direction, it may equally refer to a set of pixels of the focal plane array in the y-direction or vertical direction.

In a staring detector configuration, the entire staring array is active and therefore the full sensor field of view must be illuminated each frame. By contrast, in the rolling shutter configuration, only the active row(s), plus some margin/buffer area around the row(s), is illuminated at any given time. The illuminator may be synchronized with the rolling frame scan rate. For example, the illuminator 110 may be synchronized with the ROIC 350 to illuminate at least the portion of the field of the view of the imaging detector 130 that corresponds to the active row(s) 320 of the focal plane array 310. In some embodiments, the ROIC may be configured to generate an integrator line-synchronization signal, and the illuminator 110 may be synchronized with the integrator line-synchronization signal. Alternatively, the illuminator 110 may be configured to generate a synchronization signal, and the ROIC of the imaging detector 130 may be synchronized with this synchronization signal. In another example, the controller 160 may control synchronization of the illuminator 110 with the imaging detector 130.

In one embodiment, once all the rows 320 of the focal plane array 310 are read out (i.e., a frame scan is completed), the output image 330 may be generated by combining the integration results of each row 320. Thus, a new output image 330 may be generated for each frame. Alternatively, the output image 330 may be updated in a row-by-row manner (i.e., after each row 320 is read out).

According to various embodiments, because the directional orientation of the illuminator may be synchronized with the portion of the focal plane array 310 that is active, only a portion of the field of view of the imaging detector 130 may be illuminated at any given time. Accordingly, the amount of energy needed for illumination may be greatly reduced relative to the energy necessary to operate a comparable staring detector array. The rolling shutter operation may therefore be preferable in applications where it is desirable to limit power consumption. Examples of rolling shutter operation of detector arrays are described in more detail in commonly-owned, co-pending U.S. patent application Ser. No. 13/186,582 titled "ROLLING-SHUTTER IMAGING SYSTEM WITH SYNCHRONIZED SCANNING ILLUMINATION AND METHODS FOR HIGHER RESOLUTION IMAGING" and filed on Jul. 20, 2011, which is herein incorporated by reference in its entirety.

Thus, aspects and embodiments provide an infrared-based scope that is configurable to provide the user with the ability to visually observe cross wind in the path between the user and a viewed target, as well as a numerical estimate of the wind speed. The ability to see the air motion may allow the user to intuitively estimate the wind speed based on the user's observations. For example, the user may be able to integrate inherent cognitive reasoning, accumulated from experience, for aim point selection based on the ability to observe the actual motion of the air in the scene of the target. The user may verify their estimate with the calculated estimate of the wind speed obtained by the scope, as discussed above. By focusing the illumination beam at different ranges, the user may be able to obtain estimates of the wind speed as a function of range. Embodiments of the scope may be useful in a wide variety of applications, including, for example, long range shooting (e.g., hunting or military applications) or golf, or other applications where wind speed determination is important.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An infrared scope comprising:
an illuminator configured to emit an infrared illumination beam along a trajectory toward a target;
an imaging detector configured to receive reflected infrared electromagnetic radiation from the illumination beam and to generate images of a scene including the target from the electromagnetic radiation, the image further including scintillation cells in the trajectory;
a processor coupled to the imaging detector and configured to generate video imagery from the images generated by the imaging detector, movement of the scintillation cells in the video imagery being representative of wind speed and wind direction across the trajectory; and
a display coupled to the processor and configured to display the video imagery.

2. The infrared scope of claim 1, wherein the infrared illumination beam is in the short-wave infrared spectral band.

3. The infrared scope of claim 2, wherein a wavelength of the infrared illumination beam is approximately 0.808 micrometers.

4. The infrared scope of claim 2, wherein a wavelength of the infrared illumination beam is approximately 1.520 micrometers.

5. The infrared scope of claim 1, wherein the imaging detector includes a two-dimensional focal plane array coupled to a read-out integrated circuit, the focal plane array including a plurality of rows of pixels.

6. The infrared scope of claim 5, wherein the read-out integrated circuit is configured to individually and sequentially activate and subsequently deactivate each row of the plurality of rows of pixels to generate lines of image data, each line corresponding to a row of the plurality of rows of pixels, and wherein the imaging detector is configured to construct the images from the lines of image data.

7. The infrared scope of claim 6, wherein a directional orientation of the illuminator is synchronized with the readout integrated circuit and the illuminator is configured to sequentially illuminate portions of a field of view of the imaging detector, each portion corresponding to an activated row of the plurality of rows of pixels.

8. The infrared scope of claim 1, wherein the processor is further configured to calculate an estimate of the wind speed across the trajectory based on the movement of the scintillation cells.

9. The infrared scope of claim 8, wherein the display is further configured to display the estimate of the wind speed.

10. The infrared scope of claim 8, wherein the illuminator is a laser range-finder further configured to provide an estimate of a range to the target.

11. The infrared scope of claim 10, wherein the processor is further configured to provide a targeting offset value based on the range and the estimate of the wind speed.

12. A method of providing an estimate of wind speed and direction over a trajectory to a target comprising:
 illuminating a scene including the trajectory with infrared electromagnetic radiation;
 obtaining infrared-based video imagery of the scene, the video imagery including moving scintillation cells in the trajectory; and
 displaying the video imagery including the moving scintillation cells to allow for observation of the moving scintillation cells by a user.

13. The method of claim 12, further comprising estimating the wind speed and direction based on the observation of the moving scintillation cells.

14. The method of claim 12, further comprising:
 calculating the wind speed estimate based on the moving scintillation cells; and
 displaying the wind speed estimate.

15. The method of claim 14, further comprising:
 estimating a range to the target; and
 providing a targeting offset based on the range and the wind speed estimate.

16. The method of claim 12, wherein illuminating the scene includes illuminating the scene with the infrared electromagnetic radiation having a wavelength of approximately 0.808 micrometers.

17. The method of claim 12, wherein illuminating the scene includes illuminating the scene with the infrared electromagnetic radiation having a wavelength of approximately 1.520 micrometers.

18. The method of claim 12, wherein obtaining the infrared-based video imagery includes receiving reflected infrared electromagnetic radiation from the scene with a focal plane array.

19. The method of claim 18, wherein obtaining the infrared-based video imagery includes:
 sequentially activating rows of pixels of the focal plane array;
 sequentially deactivating and reading out the rows of pixels of the focal plane array to produce lines of image data; and
 generating the infrared-based video imagery from the lines of image data.

20. The method of claim 19, wherein illuminating the scene includes synchronously sequentially illuminating portions of a field of view of the focal plane array, each portion corresponding to an activated row of pixels of the focal plane array.

* * * * *